United States Patent [19]

Sridharan

[11] Patent Number: 5,896,872
[45] Date of Patent: Apr. 27, 1999

[54] METHOD FOR CLEANING AND SANITIZING PACKAGES CONTAINING AN EDIBLE PRODUCT

[75] Inventor: Ramanuja K. Sridharan, Novi, Mich.

[73] Assignee: Coastlog Industries, Ltd. (U.S.A.), Novi, Mich.

[21] Appl. No.: 09/024,389

[22] Filed: Feb. 17, 1998

[51] Int. Cl.$^6$ ............................................. B08B 9/20
[52] U.S. Cl. ........................ 134/25.3; 134/15; 134/26; 134/29; 134/32; 134/95.2; 134/95.3; 426/401; 426/407; 436/20; 436/22; 436/23
[58] Field of Search ........................ 134/15, 25.3, 26, 134/29, 32, 95.2, 95.3; 426/401, 407; 436/20, 22, 23

[56] References Cited

U.S. PATENT DOCUMENTS

| | | | |
|---|---|---|---|
| 3,736,948 | 6/1973 | Crosswhite | 134/95 |
| 4,051,805 | 10/1977 | Waldrum | 118/58 |
| 4,355,721 | 10/1982 | Knott, II et al. | 206/524.2 |
| 4,417,607 | 11/1983 | Scholle et al. | 141/1 |
| 4,696,580 | 9/1987 | Kameda | 374/162 |
| 4,702,777 | 10/1987 | Kuhl | 134/25.3 |
| 4,802,927 | 2/1989 | Barbour | 134/6 |
| 4,813,091 | 3/1989 | Glasener | 15/160 |
| 4,851,243 | 7/1989 | Andersen et al. | 426/74 |
| 4,921,717 | 5/1990 | Ranjith | 426/587 |
| 5,368,869 | 11/1994 | Savello et al. | 426/42 |
| 5,421,512 | 6/1995 | Poole | 229/249 |
| 5,462,606 | 10/1995 | Burns | 134/18 |
| 5,480,670 | 1/1996 | Pordy | 426/580 |
| 5,681,628 | 10/1997 | Niederst et al. | 428/35.7 |

Primary Examiner—Arlen Soderquist
Assistant Examiner—S. Carrillo
Attorney, Agent, or Firm—Charles W. Chandler

[57] ABSTRACT

Unopened packages, containing an edible food product pre-treated with a heat shock preservation process, can be sanitized in a hospital dishwasher by a method that includes washing the package outer surface with detergent, rinsing the package surface with a solution containing a sanitizing agent, and drying the package outer surface. The method is applicable to various food products, e.g. individual milk or juice packages, distributed to patients in hospitals. Use of the method permits unopened food packages handled by the patient to be supplied to other patients without worrying that germs and contaminants might be transmitted from one hospital patient to another hospital patient.

5 Claims, 1 Drawing Sheet

METHOD FOR CLEANING AND SANITIZING PACKAGES CONTAINING AN EDIBLE PRODUCT

BACKGROUND AND SUMMARY OF THE INVENTION

This invention relates to a method for cleaning and sanitizing a package containing an edible food product. The invention is particularly applicable to packaged food products distributed to hospital patients and later returned unopened to the hospital food preparation center.

More particularly, the invention is applicable to packaged food products, e.g. milk and fruit juices, that have previously been subjected to a heat shock treatment for prolonging and enhancing the shelf life of the product.

Milk and some juices are normally protected against spoilage by a pasteurization process. Typically, the pasteurization process involves heating the milk or other food to a temperature of about 175° F. for a period of at least fifteen seconds. After the pasteurization process the pasteurized product must be kept in a refrigerated condition at a temperature not exceeding 45°. If the pasteurized food item, e.g. milk, is left at room temperature for an extended period of time it will tend to spoil prematurely. Even when the pasteurized food product is kept in a refrigerated condition the shelf life is limited to a few days.

In an effort to extend the shelf life of milk, and other foods normally protected by the pasteurization process, a heat shock treatment has been devised. Such a process involves heating a raw milk product to a temperature of about 175° F., and then exposing the milk product to an elevated temperature in the range of 285° F. to 300° F. for a period of about two to four seconds. The heat treated product is then cooled rapidly to room temperature, preferably in a time period not exceeding fifteen seconds.

The described heat shock treatment is often termed the UHT process. Milk, and other products subjected to the heat shock treatment, can be stored at room temperature for prolonged periods, e.g. longer than one month, without spoilage. The shelf life of the product is extended considerably while at the same time eliminating the need for refrigeration.

Prepackaged milk, protected by the UHT heat shock treatment, is often distributed to patients in hospitals as part of the daily meal. In some instances the patient leaves the milk package (carton) unopened. Hospital officials are reluctant to distribute the unopened milk packages to other patients, because of the risk that germs and contaminants may have been picked upon the outer surface of the package while the package was being handled by the initial patient.

Rather than risk the possibility that once-used (but unopened) milk cartons could become a mechanism for transferring germs and diseases from one patient to another patient, it has been the practice to destroy such unopened milk packages.

The present invention relates to a method for washing and sanitizing once-used (but unopened) packages containing milk or other edible product pre-treated with the UHT heat shock treatment. In the preferred practice of the invention, the unopened package is subjected to a three step process using the hospital's dish washing equipment, that includes washing the outer surface of the package with a detergent, rinsing the package outer surface with a solution containing a sanitizer (disinfectant), and drying the outer surface of the package. The sanitized package is then returned to the supply of packages being stored for distribution to hospital patients. New and once-used packages are co-mingled for distribution to hospital patients.

By using the method of the present invention it becomes possible to ensure that edible product in all of the packages is consumed, rather than being thrown away. The invention eliminates some wastage that would otherwise occur.

In order to enhance the effectiveness of the process for germ (contaminant) removal purposes, the washing and rinsing steps are preferably carried out at elevated temperatures in excess of 100° F.

The washing and sanitizing actions can thus be accomplished relatively quickly, with relatively short time exposures to the elevated temperatures.

The general processes of washing, sanitizing and drying various items and materials have been previously known and practiced. U.S. Pat. No. 5,462,606, issued to John R. Burns on Oct. 31, 1995, for "Chemical Sanitizing of Foodware" discloses a dishwashing machine that includes mechanisms for washing and sanitizing dishes. U.S. Pat. No. 3,736,948, issued to Bert Crosswhite on Jun. 5, 1973, for "Washing and Sanitizing Apparatus for Carts such as Hospital Carts" shows and describes an apparatus for washing and sanitizing hospital carts. U.S. Pat. No. 4,702,777 issued to Henry Y. Kuhl on Oct. 27, 1987, for "Method and Apparatus for High Capacity Washing, Sanitizing and Drying of Stacks of Flats" illustrates an apparatus for washing, sanitizing and drying flat trays that are used to carry eggs.

The present invention applies the washing, sanitizing and drying operations to unopened packages containing edible products, e.g. milk, fruit juices, vitamins, etc. The invention is particularly directed to edible products that have been treated with the above-mentioned UHT heat shock process for enhancing the shelf life of the product. It is believed that the invention can be practiced in different environments, e.g. hospitals, prisons and restaurants.

Specific features of the invention will be apparent from the attached drawings and description of an illustrative apparatus that can be used to practice the invention. The invention relates to the method of treating the packaged food product, not the specific apparatus shown in the drawings.

DESCRIPTION OF AN APPARATUS FOR PRACTICING THE METHOD OF THE PRESENT INVENTION

Figure 1:
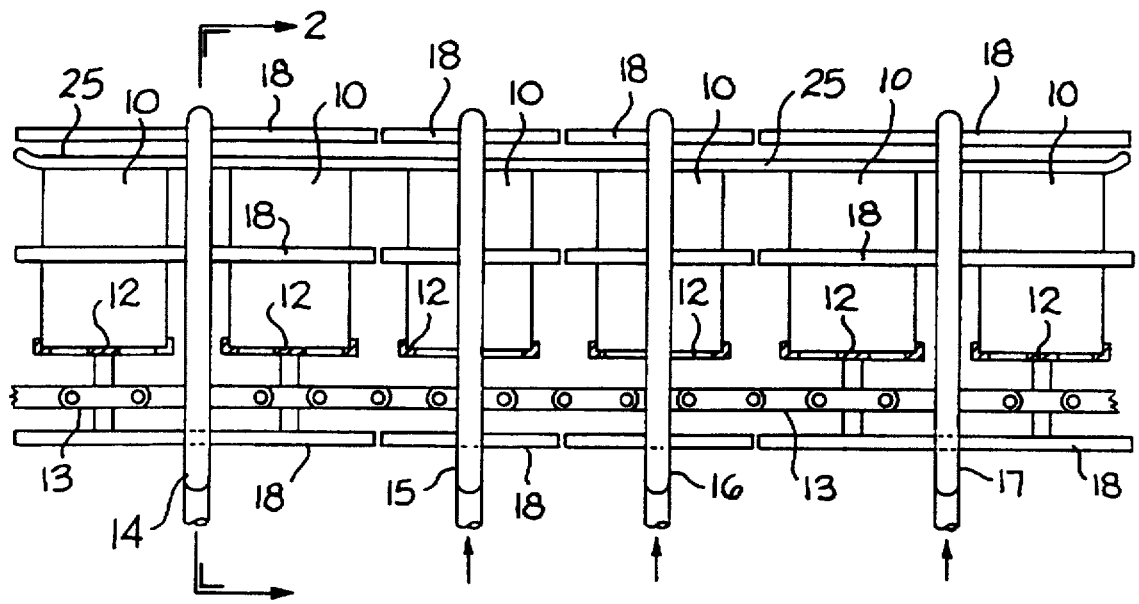
FIG. 1 is a fragmentary side elevational view of an apparatus that can be used to practice the method of the present invention.

The drawing shows an apparatus for washing, sanitizing, and drying the outer surface of an unopened package containing an edible product, according to the method of the present invention. Typically each unopened package 10 is supported on an individual rack 12 that is adapted to be drawn through the apparatus in a left-to-right direction (in FIG. 1) e.g. by a conveyor chain 13. As the package moves through the apparatus, it is subjected to a washing operation, a sanitizing operation, and a drying operation.

Package 10 will typically be a rectangular milk or juice carton having a drinking straw adhesively attached to one of its exterior side surfaces, whereby a person can remove the straw and consume the milk product. In the unopened condition the carton (package) is sealed against leakage of the milk product. The carton can have a height of about 3½", and a horizontal cross sectional dimension of about 2" by 1¼".

The individual disposable carton 10 usually comprises multiple layers of different materials designed to achieve a desired combination of structural stiffness and liquid tightness. For example, the carton wall can comprise two inner layers of polyethylene film, a layer of aluminum foil, another layer of polyethylene, a layer of paper and an outer layer of polyethylene. The aluminum foil provides a barrier against light, that can adversely affect the flavor and nutritional characteristics of the food product. The aluminum foil also has heat reflection properties.

The edible food product within the package 10 is pretreated with a heat shock treatment, specifically the aforementioned UHT process. The unopened package 10 has a comparatively long shelf life, e.g. greater than one month, when stored at room temperature.

Figure 2:
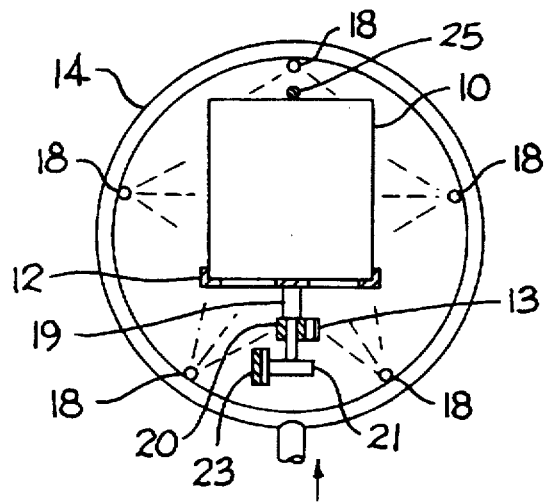
FIG. 2 is a transverse sectional view taken on line 2—2 in FIG. 1.

The process of the present invention is used to wash and sanitize unopened packages 10 that have been handled by persons under conditions where it would be expected that the exterior surface of the package has become contaminated with disease-carrying germs. As shown in FIGS. 1 and 2, the treating apparatus comprises four similarly constructed manifolds 14, 15, 16 and 17 adapted to supply specific fluids to spray nozzles 18 that are targeted on packages 10 as they pass through the apparatus in a left-to-right direction.

Manifold 14 supplies heated detergent solution at a maximum temperature of about 145° F. Manifold 15 supplies heated rinse solution containing a sanitizing material, e.g. a chlorine-releasing material; the sanitizing rinse solution has a maximum temperature of about 182° F. Manifold 16 supplies a liquid drying agent that promotes the drying process and inhibits the formation of undesired residues on the carton surface. Manifold 17 supplies heated air for drying the carton outer surface.

Each set of spray nozzles 18 can comprise plural spray tubes connected to the associated manifold so that the pressurized treating fluid flows from the manifold into the spray tubes. Each spray tube has a number of spray nozzle openings spaced along the tube length, whereby the treating fluid is sprayed onto the carton surface.

As shown in the illustrative drawing, each rack 12 has a vertical shaft 19 that extends through a swivel bearing 20 connected to conveyor chain 13. A gear 21 on the lower end of each shaft is in mesh with a stationary toothed rack 23 that parallels the conveyor chain, whereby each carton is rotated around the shaft axis as it moves through the treating apparatus. Such rotation improves the coverage of the various fluids on the carton 10 surface. An overhead stationary guide bar 25 prevents the cartons from toppling out of the associated racks.

The treating apparatus shown in FIGS. 1 and 2 represents various types of apparatus that can be employed in practicing of the method constituting the invention. Various types of apparatus can be used to achieve the steps of washing, sanitizing and drying the outer surfaces of the unopened packages 10. Preferably the apparatus should be designed to minimize the total time that each package 10 is exposed to elevated temperatures. A total exposure time of one or two minutes is preferred.

Having described my invention, I claim:

1. A method for cleaning and sanitizing an unopened rectangular carton containing an edible product selected from the group consisting of milk and juice, wherein said edible product has been previously subjected to a pasteurization process and a heat shock treatment process comprising heating said edible product to a temperature in the range of 285° F. to 300° F. for a period of about 2 to 4 seconds; said method comprising:

(a) washing the outer surface of said carton with a detergent solution;

(b) rinsing the outer surface of said carton with a solution containing a sanitizer; and (c) drying the outer surface of said carton.

2. The method of claim 1, wherein step (a) is carried out with said detergent solution having a maximum temperature of about 145° F.

3. The method of claim 2, wherein step (b) is carried out with said rinsing solution having a maximum temperature of about 182° F.

4. The method of claim 1, wherein steps (a), (b) and (c) are carried out in a total time period of less than about 2 minutes.

5. The method of claim 1, wherein the edible product is milk.

* * * * *